United States Patent [19]
Johnson

[11] 3,945,037
[45] Mar. 16, 1976

[54] FEEDBACK CONTROL SYSTEM FOR LINEAR POSITION TRANSDUCER

[75] Inventor: Albin Kenneth Johnson, Boulder, Colo.

[73] Assignee: Iomec, Inc., Santa Clara, Calif.

[22] Filed: Jan. 10, 1974

[21] Appl. No.: 433,020

Related U.S. Application Data

[63] Continuation of Ser. No. 258,779, June 1, 1972, abandoned.

[52] U.S. Cl. .................................... 360/77; 250/204
[51] Int. Cl.$^2$ .......................................... G11B 21/10
[58] Field of Search ................. 250/204; 360/77, 78

[56] References Cited
UNITED STATES PATENTS

| | | | |
|---|---|---|---|
| 3,593,333 | 7/1971 | Oswald | 360/77 |
| 3,597,750 | 8/1971 | Brunner | 360/77 |
| 3,691,543 | 9/1972 | Mueller | 360/77 |

Primary Examiner—Vincent P. Canney
Attorney, Agent, or Firm—Townsend and Townsend

[57] ABSTRACT

An electronic feedback control system which compensates for errors in the position information signals output from a pair of photodetectors in a linear motion position transducer, such as used to locate a read-write head over an addressed track in a magnetic disc file system. The control circuitry sums the instantaneous values of the time varying photodetector outputs to produce a combined output signal. The peak positive value of the combined signal is determined and compared with a preselected reference value. An error signal proportional to the difference between the peak and reference values is generated and amplified to produce a correction signal. The correction signal is then applied to the variable energization input of the light source which illuminates the photodetector pair. The correction signal reduces the error signal toward zero by causing the light source to compensate for error in the photodetector output signal.

8 Claims, 7 Drawing Figures

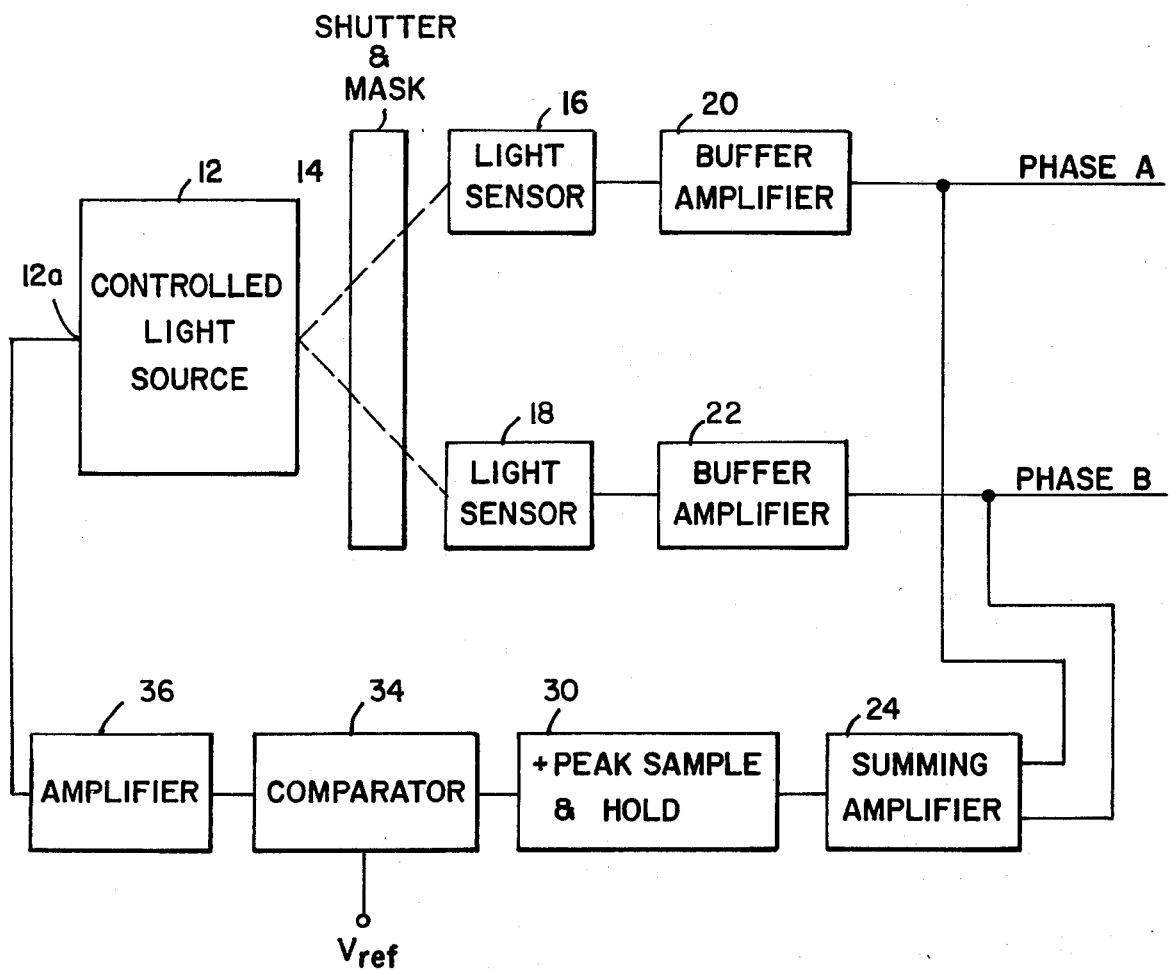
FIG_1

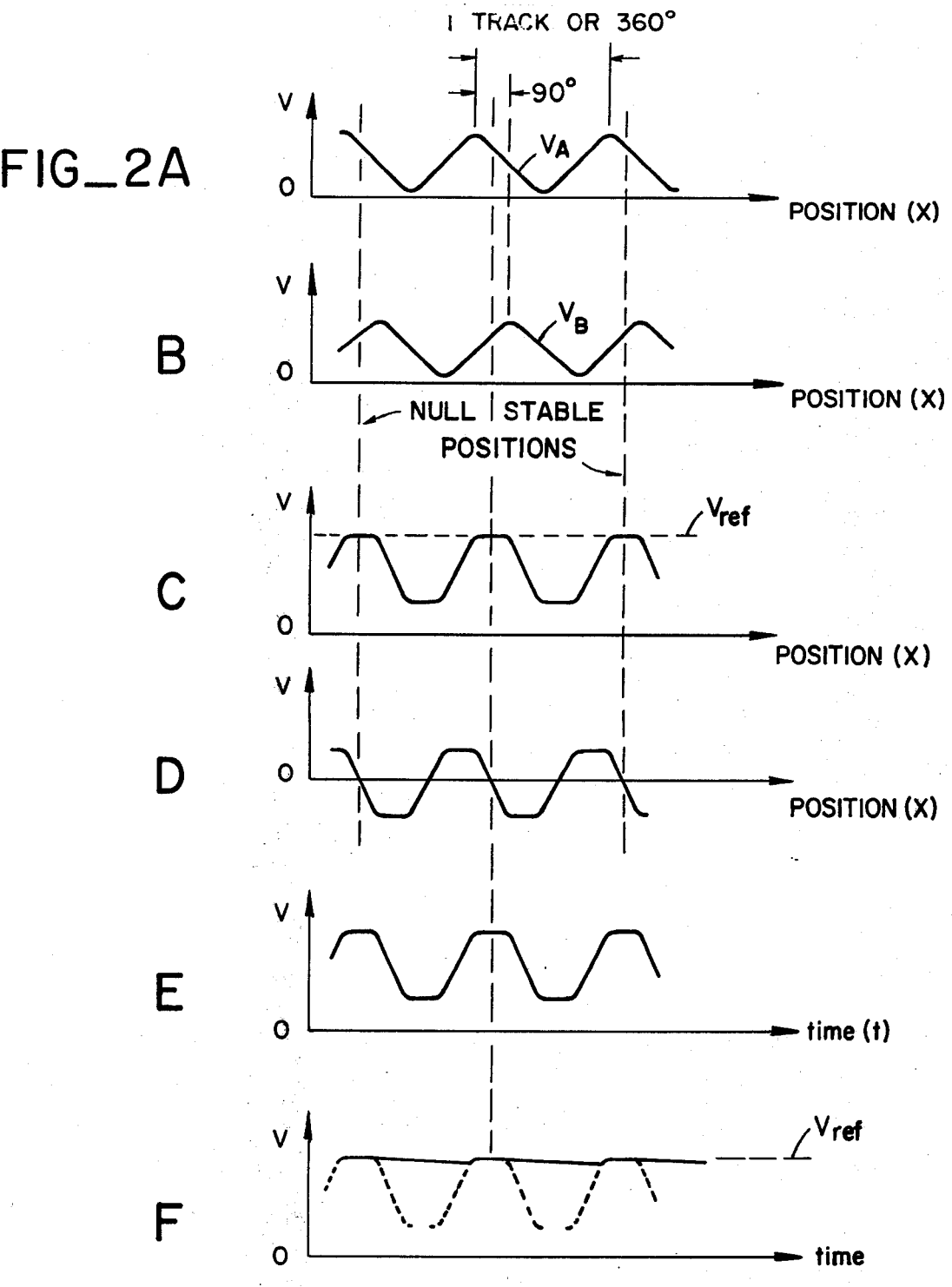

FEEDBACK CONTROL SYSTEM FOR LINEAR POSITION TRANSDUCER

This is a continuation of application Ser. No. 258,779, filed June 1, 1972, now abandoned.

The present invention relates to linear motion mechanisms and is more particularly directed to a feedback control system for correcting position information errors in a linear motion transducer such as that used to index a read-write head over an addressed track on the surface of a magnetic recording disc.

High performance direct access magnetic disc file systems employed as large auxiliary memories in data processing installations require accurate position transducers for indexing the read-write head at precise radial locations on the disc. These disc file units typically utilize an opto-electronic positioning system in which a light beam passing through a shuttering mechanism is detected by a pair of spaced photosensors. The light beam which can be visible or infrared is emitted from an incandescent or solid state light source and is modulated by the shuttering mechanism to include position information.

The shuttering mechanism generally comprises a stationary mask mounted to the disc drive housing and a shutter attached to the moving actuator which carries the read-write head. The modulated light is sensed by a photodetecting device such as a photodiode or a phototransistor. The electronic position signal generated by each of the photosensors and referred to herein as phase A and phase B is cyclic with position (one cycle per track) and the two signals are position offset with respect to each other by ¼ of the width of an individual track to produce 90° phase-displaced output signals. One such positioning system to which the present invention is particularly well adapted is disclosed in my copending U.S. Patent Application titled OPTO-ELECTRONIC TRANSDUCER FOR POSITION INITIALIZATION OF A LINEAR MOTION MECHANISM, Ser. No. 203,724, filed Dec. 1, 1971, now U.S. Pat. No. 3,749,925 issued July 31, 1973.

Parameter variations associated with this type of position transducer are of prime importance. Typically, the waveform used for positioning the actuator is obtained by differencing the phase A and phase B photodetector signals since the effect of parameter variations common to both sensors are cancelled insofar as position error is concerned. The effect will be seen instead as a change in loop gain. The most significant parameter variations are: (1) the variation of light output from the source with temperature and over life (e.g., in the case of an incandescant light source due to filament burning off and plating the inside of the envelope); (2) variation in the conversion of light to current in the photosensors over temperature and life; and (3) optical path contamination which varies the amount of light received by the sensors.

Accordingly, it is an object of the present invention to provide a feedback control system which automatically compensates for these parameter variations and enables the transducer to output a position signal that is, with respect to these parameters, constant over life. By maintaining its output constant with life the usefulness of the position transducer can be expanded to areas such as generation of velocity information from the position signal as disclosed in my copending U.S. Patent Application titled ELECTRONIC VELOCITY TRANSDUCER FOR LINEAR MOTION MECHANISM, Serial No. 279,604, filed Aug. 10, 1972, now U.S. Pat. No. 3,819,268, issued June 25, 1974.

Other objects, features and advantages of the present invention will be more readily apparent after referring to the following detailed description with reference to the accompanying drawings wherein:

FIG. 1 is a block diagram representation of the feedback control system of the present invention according to a preferred embodiment;

FIG. 2a is a waveform diagram of the phase A photodetector output signal as a function of position;

FIG. 2b is a waveform diagram of the phase B photodetector output signal as a function of position;

FIG. 2c is a waveform diagram of the combined photodetector output signal as a function of position;

FIG. 2d is a waveform diagram of the differenced photodetector output signal as a function of position;

FIG. 2e is a waveform diagram of the combined output signal as a function of time at a constant velocity; and FIG. 2f is a waveform diagram of the output from the peak sampling circuit which is compared with a preselected reference value.

Referring now to the drawings, a light source 12 is provided, the optical output of which can be selectively controlled by varying the driving voltage or current applied to input 12a. Light source 12a may be either of the incandescent or solid state type and may produce either visible or infrared light.

The light beam from source 12 passes through a shuttering mechanism 14 generally comprising a linear shutter mounted to and movable with the disk drive actuator arm and a stationary mask mounted to the disk drive housing parallel to the shutter and interposed between the shutter and a spaced pair of light sensors 16 and 18. These photodetectors may be photodiodes, phototransistors or similar devices. The relative movement of the component shutter and mask of shuttering mechansim 14 in response to actuator motion modulates the light beam impinging on photodetectors 16 and 18 in such a way as to include relative position and direction information.

The output from photodetectors 16 and 18 is electronically buffered by amplifiers 20 and 22, respectively, which output the two position signals designated in FIG. 1 as phase A and phase B and shown in FIG. 2 as waveforms 2a and 2b. Due to the construction of shuttering mechanism 14, the cyclic phase A and phase B photodetector output signals are position offset with respect to each other by one quarter the width of a disk track or 90° as shown in FIGS. 2a and 2b. The phase A and phase B position signals are applied to the input of an electronic system for deriving position, direction and velocity information (not shown). Conventional signal processing circuits form the arithmetic difference wave for phase A minus phase B shown in FIG. 2d as a function of position.

In addition, the phase A and phase B output signals are applied to the inputs of a summing amplifier 24 which adds the two signals to produce the combined waveform shown in FIG. 2c as a function of actuator position and in 2e as a function of time at constant actuator velocity.

The combined signal output from summing amplifier 24 is passed through a peak sample and hold circuit 30 which charges a capacitor to the peak positive value of the input signal and outputs a signal which periodically decreases from this peak value as the capacitor discharges, producing the output waveform shown in FIG. 2f. The holding capacitor in circuit 30 should be sized so that the decay of the output signal between sampling points (i.e., signal peaks) is at least as fast as the most rapid parameter change.

The substantially constant output from peak sample and hold circuit 30 is compared to a reference voltage $V_{ref}$ by comparator 34. The difference between the output of circuit 30 and $V_{ref}$ constitutes an error signal output from comparator 34 whose value indicates the magnitude of parameter errors and whose polarity indicates the direction in which these errors cause the photodetector output signals to vary from the ideal value. The error signal output from comparator 34 is amplified by amplifier 36 which applies a correction signal based thereon to the variable energization input of controllable light source 12. The value of the correction signal is appropriately adjusted to reduce the error signal to zero by varying the light source output to compensate for transducer parameter variations.

As stated, circuit 30 samples the positive peaks of the combined phase A plus phase B waveform and compares their value to the reference voltage $V_{ref}$. It will be seen in FIG. 2 that these waveform peaks coincide with the zero crossings of the difference waveform shown in FIG. 2d. With these zero crossings chosen as null position, the sample and hold circuit 30 will be continuously sampling at the same relative position over each track. This feature is necessary since elapsed time at the null position is indeterminate and depends on actuator velocity. With the correction system of the present invention, the only parameter variations which will not be compensated for are position offsets in parameter tracking between the two light sensors.

While one embodiment of the present invention has been shown and described herein, it will be apparent to those skilled in the art that many modifications can be made therefrom without departing from the scope of the present invention as defined by the appended claims.

I claim:

1. In a linear motion position transducer of the type having a light source with a selectively variable energizing input, a spaced pair of photosensitive devices, and a shuttering mechanism interposed therebetween for modulating the light received by said photosensitive devices, said photosensitive devices generating position information output signals in response to the light modulation, the output signals from one of said photosensitive devices being phase displaced from the output signals from the other one of said photosensitive devices by a phase angle $\phi$ in the range $0<\phi<180°$, the improvement comprising a feedback control system for electronically correcting for variation in the light parameters of said position transducer, said feedback control system including:

summing circuit means coupled to said photosensitive devices and responsive to said position information output signals for continuously algebraically summing the instantaneous values thereof to produce a combined output signal having a variable amplitude;

comparator circuit means coupled to said summing circuit means and responsive to said combined output signal for sampling the peak positive value thereof and for generating an error signal representative of the difference between said peak positive value and a reference signal having a preselected value representative of a desired value of said light parameters; and correction circuit means coupled to said comparator circuit means and responsive to said difference signal for applying a compensation signal to said light source input to reduce said error signal to zero.

2. The combination of claim 1 wherein said summing circuit means comprises a pair of buffer amplifiers each having an input coupled to the output of a different one of said photosensitive devices, and a summing amplifier having an input connected to the output of said buffer amplifiers and an output connected to the input of said comparator circuit means.

3. The combination of claim 1 wherein said comparator circuit means comprises a peak sample-and-hold circuit having an input connected to the output of said summing circuit means and a comparator circuit having one input connected to the output of said peak sample-and-hold circuit and another input connected to said reference signal and an output carrying said error signal connected to the input of said correction circuit means.

4. The combination of claim 1 wherein said correction circuit means comprises an amplifier which increases said error signal to a value sufficient to modify said light source energizing input to compensate for said light parameter variations.

5. The control system of claim 1 wherein said phase angle $\phi$ is substantially 90°.

6. Apparatus for electronically correcting errors in the position information output signals from a pair of photodetectors used in a linear motion position transducer having light parameters subject to variation, the output signals from one of said photodetectors being phase displaced from the output signals from the other of said photodetectors by a phase angle $\phi$ in the range $0<\phi<180°$, said apparatus comprising:

a light source having a selectively variable energy source;

a light modulating shutter mechanism interposed between said light source and said photodetector pair;

a summing circuit coupled to said photodetectors for continuously algebraically summing the instantaneous values of said photodetector output signals to produce a combined variable amplitude signal therefrom, said summing circuit including a pair of buffer amplifiers each having an input coupled to the output of a different one of said photodetectors, and a summing amplifier having an input connected to said buffer amplifier outputs and an output carrying said combined signal;

an error signal generation circuit for sampling the peak positive value of said combined signal and for generating an error signal representative of the difference between said peak value and a reference signal having a preselected value representative of a desired value of said light parameters, said circuit having an input connected to said summing circuit output and an output carrying said error signal; and a correction signal generation circuit for applying a correction signal to said light source input proportional to said error signal to reduce said error signal to zero, said circuit having an input connected to said error signal circuit output and an output connected to said light source input.

7. The combination of claim 6 wherein said light source and said photodetector pair are mounted to the stationary housing of a magnetic disc file unit and said shutter mechanism includes a stationary mask attached to said housing and a movable shutter attached to the read-write head actuator arm of said disc file unit.

8. The combination of claim 6 wherein said phase angle $\phi$ is substantially 90°.

* * * * *